United States Patent [19]

Hwang

[11] Patent Number: 5,729,248

[45] Date of Patent: Mar. 17, 1998

[54] CHARACTER INFORMATION PROCESSING CIRCUIT AND METHOD THEREFOR

[75] Inventor: Yong-ki Hwang, Seoul, Rep. of Korea

[73] Assignee: Samsung Electronics Co., Ltd., Kyungki-do, Rep. of Korea

[21] Appl. No.: 312,529

[22] Filed: Sep. 26, 1994

[30] Foreign Application Priority Data

Sep. 25, 1993 [KR] Rep. of Korea ............ 93-19772

[51] Int. Cl.⁶ .................................................. G09G 5/22
[52] U.S. Cl. ........................ 345/141; 345/114; 345/147; 348/569
[58] Field of Search ................................. 348/589, 600, 348/569, 678, 679, 682; 345/141, 147, 150, 113, 114, 115, 116, 25

[56] References Cited

U.S. PATENT DOCUMENTS 5,075,766 12/1991 Sendelweck ............................. 348/569
5,200,739 4/1993 Eland ...................................... 345/114
5,386,247 1/1995 Shafer et al. ........................... 348/569

Primary Examiner—Dennis-Doon Chow
Attorney, Agent, or Firm—Sughrue, Mion, Zinn, Macpeak & Seas, PLLC

[57] ABSTRACT

A character information processing circuit performs half-blanking by decreasing the gain of a video signal component representing a background screen when various OSD characters, such as a menu, are to be displayed on the screen. Reducing the gain of the background screen enables the OSD characters to be easily distinguished. It should be noted that the background screen is also visible in the region where OSD characters are displayed due to adjustment of the blanking amount of the video signal in the OSD region. The character information processing circuit permits adjustment of the screen state produced in the OSD region by an OSD circuit. A method for generating an optimal OSD display is also described.1

13 Claims, 3 Drawing Sheets

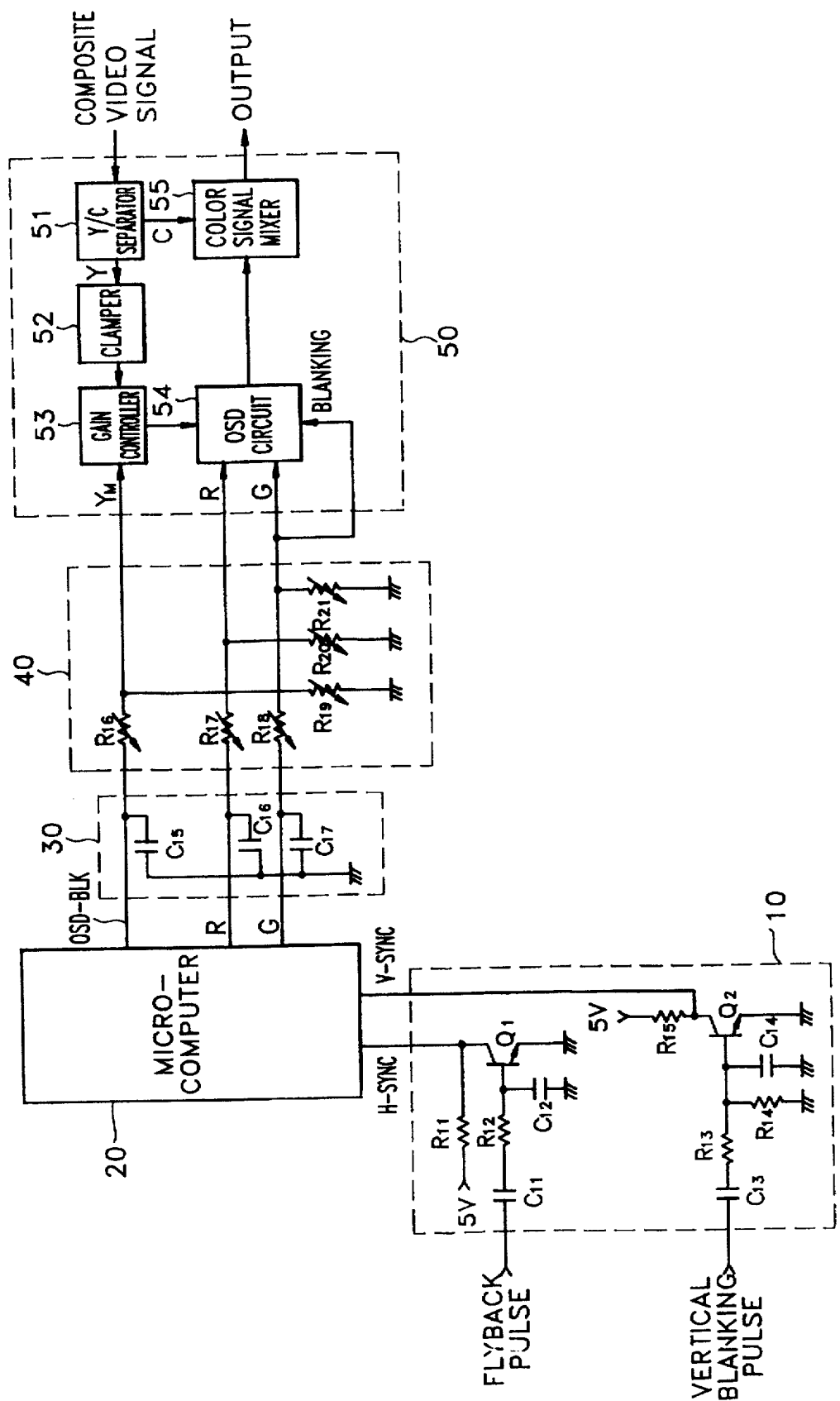

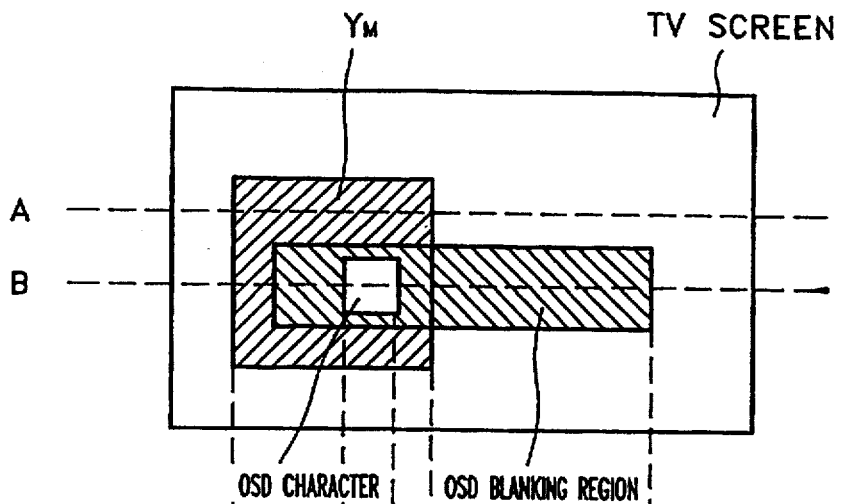

CHARACTER INFORMATION PROCESSING CIRCUIT AND METHOD THEREFOR

BACKGROUND OF THE INVENTION

1. Field of the Invention

The present invention relates to a character information processing circuit and, more particularly, to a character information processing circuit for half-blanking a background screen so that on-screen display (OSD) characters are easily identified. A method for generating an optimal OSD display is also disclosed.

The instant application is based on Korean Patent Application No. 93-19772, which is incorporated herein by reference for all purposes.

2. Brief Discussion of Related Art

In general, an OSD function in a television receiver is provided to mix character information with television video signals used for a background screen and display the resultant signal mixture on a screen. After the television video signals are blanked in the region where character information is to be displayed, the character information is displayed as a desired color signal.

FIG. 1 is a circuit diagram of a conventional character information processing circuit, wherein horizontal and vertical synchronization signals, which are synchronization signals employed for OSD functions, are input to a microcomputer 1. Microcomputer 1 applies to a color signal processing circuit 4, via a ripple remover 2 and a level matching circuit 3, an OSD blanking signal for blanking the region where character information is displayed responsive to OSD color signals, i.e., red (R), green (G) and blue (B) signals, which signals provide color information representing for characters to be displayed on the blanked region.

Color signal processing circuit 4 mixes R–Y, G–Y and B—Y color difference signals, which are demodulation signals used for the background screen, with OSD character information, and performs signal processing so that these characters can be displayed on the screen.

However, since a conventional character information processing circuit blanks only the blanking region of a screen, when various items of character information are displayed, such as in a menu, it is rather difficult to identify the items, due to the brightness of the background screen in a television. The present invention was motivated by a desire to overcome this problem.

SUMMARY OF THE INVENTION

The principal object of the present invention is to provide a character information processing circuit enabling OSD characters to be easily identified by half-blanking a background screen when OSD characters are to be displayed on a screen.

Another object according to the present invention is to provide a character information processing circuit enabling OSD characters to be easily viewed by half-blanking a background screen in a predetermined region of a screen where OSD characters are to be displayed on the screen.

Still another object of the present invention is to provide a character information processing circuit by which a background screen can be viewed in the region where OSD characters are to be displayed, by half-blanking the background screen in the vicinity of OSD characters which are to be displayed on a screen. According to one aspect of the invention, the character information processing circuit adjusts the blanking amount corresponding to the OSD blanking region.

These and other objects, features and advantages according to the present invention are provided by character information processing circuit, which advantageously includes:

a character information generator for generating character information, mixing the character information with a gain-controlled video signal to thereby produce and output a mixed signal;

a gain controller for decreasing the gain of an input video signal according to a control signal to thereby provide the gain controlled video signal to the character information generator; and a controller for producing the color information corresponding to character information applied to the character information generator and the control signal to the gain controller.

BRIEF DESCRIPTION OF THE DRAWINGS

The above objects and advantages of the present invention will become more apparent by describing in detail a preferred embodiment thereof with reference to the attached drawings in which:

FIG. 2 is a circuit diagram of the character information processing circuit according to an embodiment of the present invention;

FIG. 3 shows an example of a screen constructed by the circuit shown in FIG. 2; and FIG. 4A through FIG. 4F are waveform diagrams of the signals generated from the circuit shown in FIG. 2 for constructing the screen shown in FIG. 3.

DETAILED DESCRIPTION OF THE PREFERRED EMBODIMENTS

Figure 1:
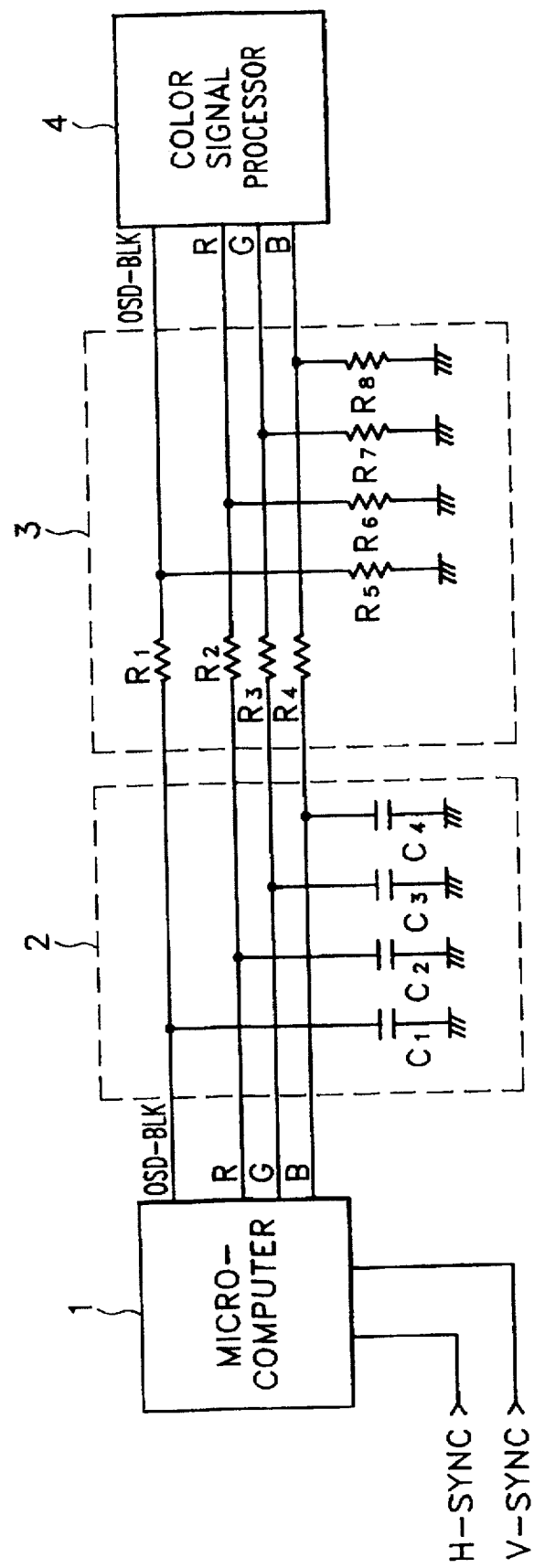
FIG. 1 is a circuit diagram of a conventional character information processing circuit.

Referring to FIG. 2, the character information processing circuit includes a synchronization signal generator 10 for generating a horizontal synchronization signal and a vertical synchronization signal responsive to a flyback pulse and a vertical blanking pulse, respectively. Preferably, the circuit also includes a microcomputer 20 for generating a half-blanking trigger signal and a character color signal in response to reception of the horizontal and the vertical synchronization signals generated by synchronization signal generator 10. A ripple remover 30 is provided for removing the ripple component contained in the half-blanking trigger signal and character color signal generated by microcomputer 20. Advantageously, a color signal processing circuit 50 is also provided for mixing character information and video signal for background screen generation and outputting the mixed signal. In an exemplary case, the background screen is generated by half-blanking the background screen and then adjusting the blanking amount in accordance with the half-blanking trigger signal and character color signal generated from microcomputer 20, respectively. According to one aspect of the present invention, a level matching circuit 40 is also provided for matching the voltage level of the half-blanking trigger signal and character color signal generated from microcomputer 20 with the input voltage level of the composite video signal applied to color signal processing circuit 50.

Preferably, synchronization signal generator (SSG) 10 includes a capacitor C11, for removing the DC component of the flyback pulse, and a resistor R12 and a capacitor C12 serially connected between the output of capacitor C11 and ground. The base of a transistor Q1 is connected to the common node between resistor R12 and capacitor C12. The emitter of transistor Q1 is grounded while the collector is connected to a power supply (5V) through a resistor R11 and to the horizontal synchronization (H-SYNC) signal port of microcomputer 20. SSG 10 also includes a capacitor C13 for removing the DC component of the vertical blanking pulse, and resistors R13 and R14 serially connected between the output of capacitor C13 and ground. Preferably, a capacitor C14 is connected in parallel with resistor R14. The base of a transistor Q2 is connected to the common node between resistors R13, R14 and capacitor C14. The emitter of transistor Q2 is grounded while the collector is connected to the power supply through a resistor R15 and to the vertical synchronization (V-SYNC) signal port of microcomputer 20.

Ripple remover 30 advantageously can include a capacitor C15 connected between the OSD blanking (OSD-BLK) port of microcomputer 20 and ground, a capacitor C16 connected between the red signal (R) output port of microcomputer 20 and ground, and a capacitor C17 connected between the green signal (G) output port of microcomputer 20 and ground.

Preferably, level matching circuit 40 includes variable resistors R16 and R19 serially connected between the OSD-BLK port of microcomputer 20 and ground, variable resistors R17 and R20 serially connected between the R output port of microcomputer 20 and ground, and variable resistors R18 and R21 serially connected between the G output port of microcomputer 20 and ground.

Color signal processing circuit 50 has a Y/C separator 51 for separating a composite video signal YC used for a background screen into a luminance signal (Y) and a color signal (C). Preferably, a clamper 52 is provided for clamping the luminance signal Y separated in Y/C separator 51. The clamped luminance signal is further regulated by a gain controller 53, which advantageously decreases the gain of the clamped luminance signal in accordance with a half-blanking trigger signal output from the OSD-BLK port of microcomputer 20. Processor 50 can also include an OSD circuit 54 for mixing OSD character data represented by color information output from the R and/or G output port(s) of microcomputer 20 with the gain-controlled, clamped luminance signal. Advantageously, a color signal mixer 55 is provided for combining the output of OSD circuit 54 with the color signal C previously output from Y/C separator 51.

FIG. 3 shows an example of a screen constructed by the circuit shown in FIG. 2. It will be appreciated that the large square represents the region where a television signal whose gain is decreased, e.g., by (−6 dB) in response to the a half-blanking trigger signal, is displayed, the rectangle represents an OSD blanking region, and the small square represents a region where OSD characters are to be displayed.

FIG. 4A through FIG. 4F are waveform diagrams of the signals generated from the circuit shown in FIG. 2 for constructing the screen shown in FIG. 3. FIGS. 4A, 4C and 4E correspond to the OSD blanking signal, the OSD character signal and the half-blanking trigger signal, respectively, during the period corresponding to the dashed line A, while FIGS. 4B, 4D and 4F represent the OSD blanking signal, the OSD character signal and the half-blanking trigger signal, respectively, during the period corresponding to dashed line B.

The operation of the circuit shown in FIG. 2 will be described in detail while referring to FIG. 2 through FIG. 4F.

In FIG. 2, the DC component of the flyback pulse output from a flyback transformer (not shown) to SSG 10 is removed by capacitor C11, the resulting signal is waveshaped, and the output signal is applied to the base of transistor Q1. Advantageously, transistor Q1 is turned on so that the phase-inverted negative flyback pulse output from the collector of transistor Q1 is applied to the H-SYNC input port of microcomputer 20 as the H-SYNC signal. In addition, the DC component of the vertical blanking pulse is removed by capacitor C13, the resulting signal is waveshaped, and the output signal is applied to the base of transistor Q2. Advantageously, transistor Q2 is turned on and the phase-inverted negative vertical blanking pulse output from the collector of transistor Q2 is applied to the V-SYNC input port of microcomputer 20 as the V-SYNC signal.

Microcomputer 20 preferably outputs a half-blanking trigger signal through its OSD-BLK port in synchronization with the horizontal and vertical synchronization signals output from SSG 10 and outputs OSD character color information through the R and/or G output port(s) according to a user-input command.

Ripple remover 30 removes the ripple component of the half-blanking trigger signal and the R and/or G signal(s) corresponding to OSD characters output from microcomputer 20 using capacitors C15 through C17. The respective filtered signals are preferably output to level matching circuit 40. In an exemplary case, the ripple-removed half-blanking trigger signal and the R and/or G signal(s) representing OSD characters consist of 5V pulses, as output from ripple remover 30. However, since the input level of color signal processing circuit 50 is generally 1V p–p, level matching circuit 40 advantageously can be provided to adjust the levels of these respective signals. In other words, level matching circuit 40 adjusts the level of the half-blanking trigger signal using variable resistors R16 and R19, adjusts the level of the red OSD character signal by variable resistors R17 and R20, and adjusts the level of the green OSD character signal by variable resistors R18 and R21.

The YM port of color signal processing circuit 50, responsive to the half-blanking trigger signal, decreases the gain (here, by 6 dB) of a television signal used as a background screen. In an exemplary case, a high level half-blanking trigger signal received at the YM port produces the gain decrease. That is to say, when the YM port of color signal processing circuit 50 is high, the gain of the television signal is decreased before it is applied to OSD circuit 54.

It will be appreciated from study of FIG. 2 that the blanking amount of the portion where OSD characters are to be generated, i.e., the OSD blanking region, varies depending on the pulse voltage applied to the blanking port of OSD circuit 54, which, in an exemplary case, is commonly connected with the G output port of microcomputer 20. It should be noted however that while the present invention adopts the green signal output from microcomputer 20 as the blanking signal, the red signal could just as well have been adopted. Moreover, although red and green signals are adopted to provide the color signal information for on-screen display, the blue signal may be adopted as well.

The relationship between blanking amount and pulse voltage is indicated in the following Table 1.

TABLE 1

| Voltage Applied to Blanking Port | Blanking Amount |
| --- | --- |
| 0 V | 0% |
| 1 V | 10% |
| 2 V | 30% |
| 4 V | 75% |
| 5 V | 100% |

Meanwhile, although the gain is decreased by 6 dB according to a preferred embodiment of the present invention, the gain decrement of the television luminance signals representing the background screen may be controlled variably, for example, depending on the voltage of the half-blanking trigger signal input to the YM port of color signal processing circuit 50. In an Exemplary case, the relationship between voltage input to the YM port and gain decrement can be as indicated in Table 2.

TABLE 2

| YM Port Voltage | Gain Decrement |
| --- | --- |
| 0 V | −3 dB |
| 1 V | −6 dB |
| 3 V | −9 dB |
| 5 V | −12 dB |

Therefore, color signal processing circuit 50 mixes a luminance signal, whose gain is adjusted by the half-blanking trigger signal, with OSD characters corresponding to red and/or green color information signals, combines the mixed signal with a color signal C, and then displays OSD characters on a screen. A screen constructed by the circuit shown in FIG. 2 is shown in FIG. 3, which is explained with reference to FIGS. 4A through 4F.

In FIG. 3, the period represented by the dashed line A marked on a television screen is indicative of the state where the gain of the television signal is decreased by 6 dB in response to a high level half-blanking trigger signal. By inspection it will be noted that during the period represented by line A, only the half-blanking trigger signal is high, as shown in FIG. 4E. Preferably, the OSD blanking signal and the R and/or G signal(s) representing OSD characters are low, as shown in FIGS. 4A and 4C.

In contrast, during the period corresponding to the dashed line B marked on a television screen, the half-blanked and OSD characters are displayed within the predetermined OSD blanking region. Therefore, as shown in FIG. 4F, during the period corresponding to the large square, the half-blanking trigger signal is high. The OSD blanking signal is high during the period corresponding to the OSD blanking region (FIG. 3), as shown in FIG. 4B, while the R and/or G signal(s) for OSD characters are high during the period corresponding to the OSD character region of FIG. 3, as shown in FIG. 4D.

It will be appreciated that during the high level period of FIG. 4D, the OSD character signal is generated. For example, if a character color is green, the green input of color signal processing circuit 50 is high, and if yellow, the red and green inputs of color signal processing circuit 50 are high. It will also be appreciated that the blanking port of OSD circuit 54 may advantageously be responsive to a lower level of the applied G output signal than that needed to drive the G input port of OSD circuit 54.

As described above, the character information processing circuit according to the present invention enables OSD characters which are displayed on a screen to be identified easily, even while the background screen is simultaneously visible. Advantageously, the processing circuit reduces the gain of a television signal component corresponding to a predetermined background region where the OSD characters are to be displayed. Readability is further enhanced by adjusting the blanking amount of the OSD blanking region in which the OSD characters are to be displayed.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A character information processing circuit comprising:

gain controlling means for variably adjusting a signal level for a received video signal according to a control signal to thereby provide a background input video signal;

character information generating means for generating character information responsive to color information, for mixing the background input video signal provided by said gain controlling means with said character information, and for providing a mixed signal; and controlling means for generating said color information corresponding to said character information applied to said character information generating means and for producing said control signal applied to said gain controlling means.

2. The character information processing circuit as claimed in claim 1, wherein said control signal output from said controlling means permits the signal level of the background video signal to be decreased in a predetermined region including a respective region where said character information is generated.

3. The character information processing circuit as claimed in claim 1, further comprising means for determining a gain decrement for said gain controlling means.

4. The character information processing circuit as claimed in claim 1, wherein said character information generating means includes means for blanking a respective region where characters are to be displayed responsive to said color information, and means for generating said character information on said respective region.

5. The character information processing circuit as claimed in claim 1, further comprising means for determining a blanking amount for display of said mixed signal based on said color information.

6. The character information processing circuit of claim 1, wherein said background input video signal comprises an information-bearing luminance signal.

7. In a video apparatus having an on-screen display (OSD) function, a character information processing circuit comprising:

synchronization signal generating means for generating horizontal and vertical synchronization signals responsive to a flyback pulse and a vertical blanking pulse, respectively;

controlling means for generating a half-blanking trigger signal and a character color signal for determining a background region subjected to half-blanking, in synchronization with the horizontal and vertical synchronization signals output by said synchronization signal generating means;

signal processing means for half-blanking an input video signal corresponding to said background region in response to said half-blanking trigger signal thereby producing a half-blanked video signal, for generating character information responsive to said character color signal, and for mixing said character information with said half-blanked video signal; and level matching means for matching respective levels of said half-blanking trigger signal and said character color signal, output from said controlling means, with an input level of said input video signal applied to said signal processing means.

8. The character information processing circuit as claimed in claim 7, wherein the character color signal output from said controlling means comprises red and green signals.

9. The character information processing circuit as claimed in claim 7, wherein said signal processing means performs half-blanking by decreasing a gain of said input video signal when said half-blanking trigger signal has a predetermined level.

10. The character information processing circuit as claimed in claim 9, wherein gain decrement of said input video signal is controlled in accordance with a level control amount of said level matching means.

11. The character information processing circuit as claimed in claim 7, wherein said signal processing means half-blanks said input video signal in a respective region where said character information are to be displayed and wherein the half-blanking amount depends on an output level of said level matching means.

12. The character information processing circuit as claimed in claim 7, wherein said input video signal is an input composite video signal and wherein said signal processing means comprises:

separating means for separating said input composite video signal into a luminance signal and a color signal;

gain controlling means for decreasing a level of said luminance signal responsive to said half-blanking trigger signal thereby producing a gain-decreased luminance signal;

OSD means for generating characters responsive to said character color signal and for mixing said characters with said gain-decreased luminance signal; and mixing means for mixing a respective output of said OSD means with said color signal to thereby generate a mixed signal.

13. In a video apparatus having an on-screen display (OSD) function using a character information processing circuit having a character information generator for generating character information, a level controller for decreasing gain of a received video signal component, and a controller for generating color information corresponding to the character information and a control signal applied to the gain controller, a method for generating an OSD screen including a background screen region and an included OSD blanking region comprises the steps of:

(a) separating a received composite video signal into luminance and color signal components;

(b) gain controlling said luminance signal component based on said control signal to thereby produce a gain-controlled luminance signal;

(c) selectively generating said character information and blanking said gain-controlled luminance signal responsive to the color information;

(d) mixing said character information with said gain-controlled luminance signal to thereby produce a mixed signal; and (e) combining said chrominance color signal component with said mixed signal to thereby produce said OSD screen.

* * * * *